United States Patent
Strunck et al.

(10) Patent No.: US 12,513,636 B2
(45) Date of Patent: Dec. 30, 2025

(54) METHOD AND APPARATUS FOR DETERMINING AND DEALING WITH AN INCORRECT SYSTEM TIME OF A ROAD USER

(71) Applicant: Continental Automotive Technologies GmbH, Hannover (DE)

(72) Inventors: Sebastian Strunck, Niedernhausen (DE); Marc Menzel, Weimar (DE); Thomas Grotendorst, Eschborn (DE)

(73) Assignee: Continental Automotive Technologies GmbH, Hannover (DE)

( * ) Notice: Subject to any disclaimer, the term of this patent is extended or adjusted under 35 U.S.C. 154(b) by 341 days.

(21) Appl. No.: 18/274,656

(22) PCT Filed: Jan. 25, 2022

(86) PCT No.: PCT/DE2022/200008
§ 371 (c)(1),
(2) Date: Jul. 27, 2023

(87) PCT Pub. No.: WO2022/161583
PCT Pub. Date: Aug. 4, 2022

(65) Prior Publication Data
US 2024/0098665 A1     Mar. 21, 2024

(30) Foreign Application Priority Data
Jan. 29, 2021 (DE) .................. 10 2021 200 827.5

(51) Int. Cl.
*H04W 56/00* (2009.01)
*H04W 4/40* (2018.01)
(52) U.S. Cl.
CPC ......... *H04W 56/0015* (2013.01); *H04W 4/40* (2018.02)

(58) Field of Classification Search
CPC .................. H04W 4/40–46; H04W 56/0015
See application file for complete search history.

(56) References Cited

U.S. PATENT DOCUMENTS

2017/0237474 A1     8/2017 Haran
2018/0352525 A1*   12/2018 Li .................. H04W 56/004
(Continued)

FOREIGN PATENT DOCUMENTS

| DE | 102016217811 A1 | 3/2018 |
| EP | 0702464 A1 | 3/1996 |
| WO | 2017033486 A1 | 3/2017 |

OTHER PUBLICATIONS

Office Action dated Nov. 23, 2021 from corresponding German patent application No. 10 2021 200 827.5.
(Continued)

*Primary Examiner* — Thomas R Cairns

(57) ABSTRACT

A method for execution by an apparatus belonging to a first road user comprises receiving a vehicle-to-X (V2X) message by a V2X communication apparatus, wherein the V2X message comprises time information for determining a system time of a second road user, determining a system time of the first road user, comparing the system times of the first road user and the second road user, wherein, if a determined discrepancy between the system times of the first road user and the second road user is equal to or exceeds a limit value, it is determined whether the system time of the first road user or of the second road user is incorrect, and correcting the system time of the first road user if the system time of the first road user is incorrect, or outputting a control signal for communicating that the system time of the second road user is incorrect.

10 Claims, 1 Drawing Sheet

(56) References Cited

U.S. PATENT DOCUMENTS

| | | | |
|---|---|---|---|
| 2019/0037513 A1* | 1/2019 | Yang | H04W 56/002 |
| 2019/0206153 A1 | 7/2019 | Antoni et al. | |
| 2019/0289627 A1* | 9/2019 | Blasco Serrano | H04W 56/00 |
| 2020/0014525 A1* | 1/2020 | Nasr | H04J 3/0667 |
| 2020/0288419 A1* | 9/2020 | Gao | H04W 4/46 |
| 2021/0003661 A1* | 1/2021 | Xu | G01S 13/931 |
| 2021/0243711 A1* | 8/2021 | Yeo | H04W 56/0015 |
| 2022/0240207 A1* | 7/2022 | Balasubramanian | H04W 24/10 |
| 2023/0376069 A1* | 11/2023 | Venugopalappa | H04W 4/029 |

OTHER PUBLICATIONS

International Search Report and Written Opinion dated May 11, 2022 from corresponding International patent application No. PCT/DE2022/200008.

ETSI EN 302 637-2 V1.4.1 (Apr. 2019) Intelligent Transport Systems (ITS); Vehicular Communications; Basic Set of Applications; Part 2: Specification of Cooperative Awareness Basic Service, European Standard, ETSI, 2019.

SAE International "Surface Vehicle Standard J2735", (R) V2X Communications Message Set Dictionary, Nov. 2022, Issued: Dec. 2006, Revised: Nov. 2022, Superseding J2735 Jul. 2020.

\* cited by examiner

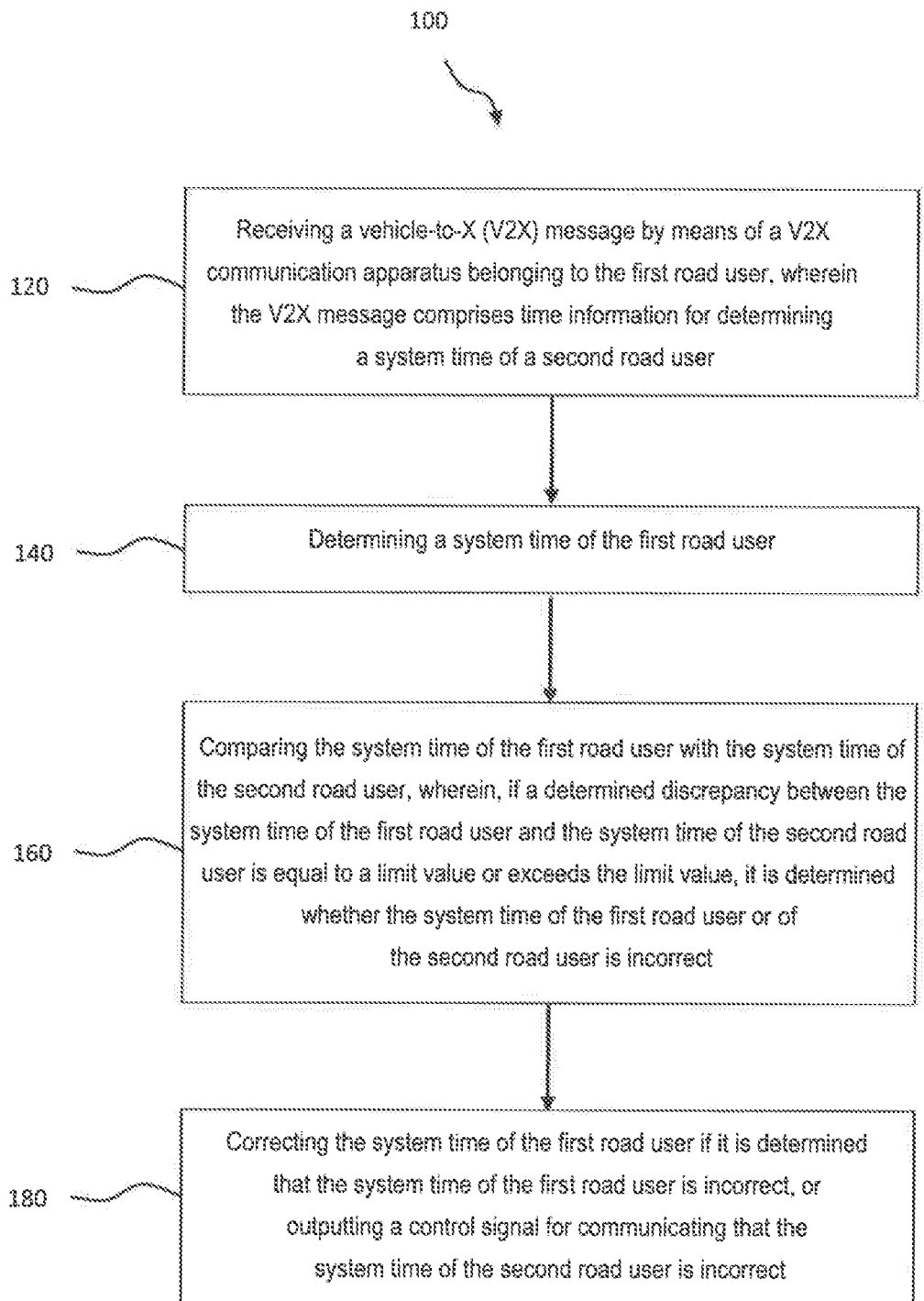

METHOD AND APPARATUS FOR DETERMINING AND DEALING WITH AN INCORRECT SYSTEM TIME OF A ROAD USER

CROSS REFERENCE TO RELATED APPLICATIONS

This U.S. patent application claims the benefit of PCT patent application No. PCT/DE2022/200008, filed Jan. 25, 2022, which claims the benefit of German patent application No. 10 2021 200 827.5, filed Jan. 29, 2021, both of which are hereby incorporated by reference.

TECHNICAL FIELD

The disclosure relates to a method and a corresponding apparatus, in particular for determining and dealing with an incorrect system time of a road user.

BACKGROUND

If vehicle to X (V2X) messages are transmitted, they must be timed in the appropriate sequence. In principle, time information is used to determine the system time of the sender in the V2X messages. The system time is usually updated by means of a time signal from a Global Satellite Navigation System (GNSS) in order to have the most accurate time basis possible.

An accurate time basis is becoming increasingly important for processing information received via V2X, in order to be able to sequence the V2X messages correctly as vehicles become increasingly automated. For example, a received position of a road user must correspond to a specific point in time or be assignable to a received system time in order to be able to determine the exact position of the road user at a specific point in time. Especially in the case of, for example, the Collective Perception Message (CPM), with which information about detected sensor objects may be transmitted, the time of the detection by the sensor system of a transmitting road user is a critical piece of information, on the basis of which the detected object may be predicted by a road user receiving the CPM. The continuing integration of V2X technologies also increases the need for time synchronization.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The object of the disclosure may be considered to be to provide solutions for determining and dealing with an incorrect system time of a road user.

According to a first aspect of the disclosure, a method is provided for execution by an apparatus belonging to a first road user, and in particular for determining and dealing with an incorrect system time of the first road user or of a second road user, comprising receiving a vehicle-to-X (V2X) message by a V2X communication apparatus belonging to the first road user, wherein the V2X message comprises time information for determining a system time of a second road user, determining a system time of the first road user, comparing the system time of the first road user with the system time of the second road user, wherein, if a detected discrepancy between the system time of the first road user and the system time of the second road user is equal to a limit value or exceeds the limit value, it is determined whether the system time of the first road user or of the second road user is incorrect, and correcting the system time of the first road user if it is determined that the system time of the first road user is incorrect, or outputting a control signal for communicating that the system time of the second road user is incorrect.

The idea underlying the disclosure is that the timestamp of a V2X message transmitted by a road user is checked with the system time of a road user receiving the V2X message, wherein if a discrepancy between the time of the timestamp of the V2X message and the system time of the receiving road user is greater than a limit value it may be assumed that the time basis of either the transmitter or the receiver is incorrect. A time basis is regarded as incorrect in particular if the system time of a road user in question deviates substantially from a time basis to be treated as a reference time, e.g. a time basis provided by a time signal of a global satellite navigation system (GNSS). A discrepancy may be regarded as significant if the difference from the reference time is equal to or greater than a limit value, wherein the limit value may be chosen depending on the individual application and/or the respective situation. According to at least one embodiment, it is determined that the system time of the first road user and/or the second road user is incorrect if the discrepancy between the system time of the first road user and the system time of the second road user is equal to the limit value or exceeds the limit value. It thus becomes possible to check the system time of the first and/or second road user by the first road user itself. This enables a more reliable exchange of information.

Road users are generally considered to include vehicles, pedestrians and/or cyclists. The first road user is, in particular, a vehicle, wherein the vehicle may be a motor vehicle, in particular an automobile, a heavy goods vehicle, a motorcycle, an electric motor vehicle or a hybrid motor vehicle, a watercraft, or an aircraft.

The control signal for communicating an incorrect system time of the second road user may be used, for example, for displaying an information and/or warning message to a driver of the first vehicle and/or for an at least partially automated driving function for carrying out further measures, such as an intervention in the vehicle dynamics.

The system time is understood in particular to mean the local time basis used by the electronics or software, for example, of a relevant road user. This local time basis may be updated by means of a global time signal, e.g. a time signal of a Global Satellite Navigation System (GNSS).

According to at least one embodiment, it is determined that the system time of the second road user is incorrect if a discrepancy between the system time of the second road user and a system time of at least one third road user and/or of a central data processing device is also equal to the limit value or exceeds the limit value. Thus, the system time of the second road user would deviate from the system time of the first road user and at least of the third road user and/or of the central data processing device by an amount equal to or greater than the limit value, from which it may be assumed that the system time of the second road user is incorrect. The central data processing device may, for example, implement an Internet service for providing a time of day and/or be represented by a so-called road side unit. The request to the central data processing device is made in particular by a mobile radio network and/or V2X communication.

According to one embodiment, the method may accordingly also comprise receiving a vehicle-to-X (V2X) message by means of a V2X communication apparatus belonging to the first road user, wherein the V2X message comprises time information for determining a system time of a third road user or of a central data processing device, determining a system time of the first road user, and comparing the system time of the first road user with the system time of the third road user or of the central data processing device.

If the first road user determines that the system time of the second road user is incorrect, then as a consequence of the control signal for communicating that the system time of the second road user is incorrect, according to at least one embodiment the first road user transmits a V2X message, comprising an identifier for identifying the second road user and information about the incorrect system time of the second road user by the V2X communication apparatus. In particular, the first road user may alternatively or additionally transmit the absolute value of the detected discrepancy with the V2X message.

If the first road user determines that the system time of the second road user is incorrect, as a consequence of the control signal for communicating that the system time of the second road user is incorrect, in particular in order to still be able to properly exploit or further process further information which is included in the received V2X message of the second road user, according to at least one embodiment, a correction is applied to the received system time of the second road user based on the system time of the first road user, of the third road user and/or of the central data processing device. In particular, in order to correct the received system time of the second road user, the received system time of the second road user may be set equal to the system time of the first road user or of the third road user or of the central data processing device, or else a first discrepancy value is ascertained from the time differences of the system time of the first road user and/or the third road user and/or the central data processing device relative to the system time of the second road user and used for correcting the received system time of the second road user. This may, for example, prevent the potentially safety-critical information from being discarded due to an incorrect system time of the second road user. According to an embodiment, for this purpose the first road user may apply a correction to the received system time of the second road user by using sensor information obtained by sensors of the first road user.

According to an embodiment, a correction may also be applied for the subsequent incoming V2X messages, comprising time information for determining a system time of the second road user as a function of the discrepancy detected in each case. In particular, in comparison to a permanent application of the initially applied correction by an appropriate amount, it may thus be ensured that, for example, a correction is not applied if the second road user has applied a correction to its own time basis between the transmission of two V2X messages comprising the time information.

According to at least one embodiment, it is determined that the system time of the first road user is incorrect if a discrepancy between the system time of the first road user and a system time of at least one third road user and/or of a central data processing device is equal to the limit value or exceeds the limit value.

According to at least one embodiment, the limit value for positive as well as negative differences may be configured to be symmetrical or asymmetrical.

A symmetrical implementation of the limit value may be particularly advantageous if a transmission time and, if applicable, processing time of the V2X message from the second road user to the first road user must be taken into account. This transmission time and, if applicable, processing time may be estimated, for example. The calculated difference (td) of the system time of the first road user (t1) from the system time of the second road user evaluates under this condition to td=t1−(t2+tk). This difference may then be compared with the symmetric limit value.

An asymmetrical implementation of the limit value may be particularly advantageous if a transmission time and, if applicable, processing time of the V2X message from the second road user to the first road user will not be taken into account. The calculated difference (td) of the system time of the first road user (t1) from the system time of the second road user evaluates under this condition to td=t1−t2. This difference may then be compared with the asymmetrical limit value, wherein in particular positive differences from the limit value may be made greater than negative differences of the system times.

This is based on the idea that, if the first road user has a time basis that deviates from at least two different road users and/or the second road user and the central data processing device, the time basis of the first road user is highly likely to be incorrect.

The time information thus received for determining a system time of a third road user and/or of a central data processing device can thus additionally be used in the same way for the comparison with the system time of the first road user.

If the first road user determines that the system time of the first road user is incorrect, a correction is applied to the system time of the first road user based on the system time of the second road user, the third road user, and/or the central data processing device.

According to an embodiment, in order to correct the system time of the first road user, the received system time of the second road user or of the third road user or of the central data processing device is set equal to the system time of the first road user, or else a discrepancy value is ascertained from the time differences of the system time of the second road user and/or the third road user and/or the central data processing device relative to the system time of the first road user and used for correcting the system time of the first road user. In particular, to form the corrected system time of the first road user, the determined discrepancy value is added to the system time of the first road user.

According to an embodiment, the V2X message received by the first road user can comprise confidence information for describing a confidence value of the system time of the second road user, and/or a V2X message transmitted by the first road user may comprise confidence information for describing a confidence value of the system time of the first road user and/or the second road user. On the one hand, confidence information about the accuracy of the determined system time may already be provided by the second road user, and on the other hand, determined confidence information of the system time of the first road user and/or the second road user may be provided to other road users or to the second road user. The confidence value may be used in particular to evaluate the confidence interval of the system time provided. If the first road user has determined its own system time incorrectly and if its own system time has been corrected using the system time of the second road user and/or the third road user and/or the central data processing device, the confidence value may be used to describe the confidence interval. If there is no GPS reception, for example, the confidence value is reduced depending on the quality of a time update without the possibility of synchronization to a time provided, in particular, by a global satellite navigation system (GNSS). This absence of GNSS reception may occur, for example, when traveling in a tunnel or quarry.

According to an embodiment, the confidence information may be represented by the so-called "DE_TimeAccuracy" data element of the "DE_FullPositionVector" of the Basic Safety Message (BSM) according to SAE J2735, e.g. characterized by a value of 1 s, and/or by the "Performance class" data field of a Cooperative Awareness Message (CAM) according to the ETSI standard, e.g. characterized by the lowest class.

According to a second aspect of the disclosure, an apparatus for a first road user is described, configured to carry out the following steps of receiving a vehicle-to-X (V2X) message by a V2X communication apparatus belonging to the apparatus, wherein the V2X message comprises time information for determining a system time of a second road user, determining a system time of the first road user, in particular by a computing device of the apparatus, comparing the system time of the first road user with the system time of the second road user, in particular by the computing device and/or a further computing device of the apparatus, wherein, if a detected discrepancy between the system time of the first road user and the system time of the second road user is equal to a limit value or exceeds the limit value, it is determined whether the system time of the first road user or of the second road user is incorrect, and correcting the system time of the first road user if it is determined that the system time of the first road user is incorrect, or outputting a control signal for communicating that the system time of the second road user is incorrect, in particular by the computing device and/or the further computing device.

According to a further aspect of the disclosure, the apparatus is configured to carry out a method as claimed in at least one of the described embodiments.

The apparatus comprises a computing device for carrying out one or more steps of at least one of the described embodiments of the method. A computing device may be any device that is designed to process signals. In particular, the computing device may be a processor, for example an ASIC, an FPGA, a digital signal processor, a central processing unit (CPU), a multi-purpose processor (MPP) or the like.

In one development of the specified apparatus, the specified apparatus has a memory. In this case, the specified method is stored in the memory in the form of a computer program, and the computing device is provided for carrying out the method when the computer program is loaded into the computing device from the memory.

According to a further aspect of the disclosure, a computer program comprises program code in order to perform all the steps of one of the specified methods when the computer program is executed on a computer or one of the specified apparatuses.

According to a further aspect of the disclosure, a computer program product contains a program code that is stored on a computer-readable data carrier and that, when executed on a data processing device, performs one of the specified methods.

In accordance with a further aspect, the disclosure relates to the use of at least one of the embodiments of the apparatus in a vehicle.

DETAILED DESCRIPTION

FIG. 1 shows, in the form of a sequence diagram, an embodiment of the method 100 for execution by an apparatus belonging to a first road user according to the disclosure. In this case, in a step 120 a vehicle-to-X (V2X) message is received by a V2X communication apparatus of the first road user, the V2X message comprising time information for determining a system time of a second road user, and in a step 140 a system time of the first road user is determined. In a step 160 the system time of the first road user is compared with the system time of the second road user, wherein, if a determined discrepancy between the system time of the first road user and the system time of the second road user is equal to a limit value or exceeds the limit value, it is determined whether the system time of the first road user or of the second road user is incorrect. In a step 180 the system time of the first road user is corrected if it is determined that the system time of the first road user is incorrect, or a control signal is output for communicating that the system time of the second road user is incorrect.

If it is found in the course of the proceedings that a feature or a group of features is not absolutely necessary, then the applicant aspires right now to a wording of at least one independent claim that no longer has the feature or the group of features. This may be, for example, a subcombination of a claim present on the filing date or a subcombination of a claim present on the filing date that is restricted by further features. Claims or combinations of features of this kind requiring rewording are intended to be understood as also covered by the disclosure of this application.

It should also be pointed out that refinements, features and variants of the disclosure which are described in the various embodiments or exemplary embodiments and/or shown in the figures may be combined with one another in any desired manner. Single or multiple features are interchangeable with one another in any desired manner. Combinations of features arising therefrom are intended to be understood as also covered by the disclosure of this application.

Back-references in dependent claims are not intended to be understood as a relinquishment of the attainment of independent substantive protection for the features of the back-referenced dependent claims. These features may also be combined with other features in any desired manner.

Features which are only disclosed in the description or features which are only disclosed in the description or in a claim in conjunction with other features may in principle be of independent significance essential to the disclosure. They may therefore also be individually included in claims for the purpose of delimitation from the prior art.

In general, it should be pointed out that vehicle-to-X communication is understood to mean in particular a direct communication between vehicles and/or between vehicles and infrastructure devices. For example, it may thus include vehicle-to-vehicle communication or vehicle-to-infrastructure communication. Where this application refers to a communication between vehicles, said communication may fundamentally take place as part of a vehicle-to-vehicle communication, for example, which is typically effected without switching by a mobile radio network or a similar external infrastructure and which must therefore be distinguished from other solutions based on a mobile radio network, for example. By way of example, a vehicle-to-X communication may be implemented using the IEEE 802.11p or IEEE 1609.4 or 5G NR standards. A vehicle-to-X communication may also be referred to as C2X communication or V2X communication. The sub-domains may be referred to as C2C (car-to-car), V2V (vehicle-to-vehicle) or C2I (car-to-infrastructure), V2I (vehicle-to-infrastructure). However, the disclosure explicitly does not exclude vehicle-to-X communication with switching via a mobile radio network, for example.

The invention claimed is:

1. A method for execution by an apparatus belonging to a first road user, comprising:
receiving a vehicle-to-X (V2X) message by a V2X communication apparatus belonging to the first road user, wherein the V2X message comprises time information for determining a system time of a second road user;
determining a system time of the first road user;
comparing the system time of the first road user with the system time of the second road user, wherein, if a detected discrepancy between the system time of the first road user and the system time of the second road user is equal to a limit value or exceeds the limit value, it is determined whether the system time of the first road user or of the second road user is incorrect; and
correcting the system time of the first road user if it is determined that the system time of the first road user is incorrect, or outputting a control signal for communicating that the system time of the second road user is incorrect.

2. The method as claimed in claim 1, wherein it is determined that the system time of the second road user is incorrect if a discrepancy between the system time of the second road user and a system time of at least one third road user and/or a central data processing device is also equal to the limit value or exceeds the limit value.

3. The method as claimed in claim 1, wherein as a consequence of the control signal for communicating that the system time of the second road user is incorrect, a V2X message is transmitted, comprising an identifier for identifying the second road user and information about the incorrect system time of the second road user.

4. The method as claimed in claim 2, wherein for processing further information included in the V2X message received from the second road user, as a consequence of the control signal for communicating that the system time of the second road user is incorrect, a correction is applied to the system time of the second road user based on the system time of the first road user, the third road user and/or the central data processing device.

5. The method as claimed in claim 4, wherein in order to correct the received system time of the second road user, the received system time of the second road user is set equal to the system time of the first road user or the third road user or the central data processing device, or else a discrepancy value is ascertained from the time differences of the system time of the first road user and/or the third road user and/or the central data processing device relative to the system time of the second road user and used for correcting the received system time of the second road user.

6. The method as claimed in claim 2, wherein it is determined that the system time of the first road user is incorrect if a discrepancy between the system time of the first road user and a system time of at least one third road user and/or a central data processing device is also equal to the limit value or exceeds the limit value.

7. The method as claimed in claim 6, wherein a correction is applied to the system time of the first road user based on the system time of the second road user, the third road user, and/or the central data processing device.

8. The method as claimed in claim 7, wherein in order to correct the system time of the first road user, the received system time of the second road user or of the third road user or of the central data processing device is set equal to the system time of the first road user, or else a discrepancy value is ascertained from the time differences of the system time of the second road user and/or the third road user and/or the central data processing device relative to the system time of the first road user and used for correcting the system time of the first road user.

9. The method as claimed in claim 1, wherein the V2X message received by the first road user comprises confidence information for describing a confidence value of the system time of the second road user and/or a V2X message transmitted by the first road user comprises confidence information for describing a confidence value of the system time of the first road user and/or the second road user.

10. An apparatus for a first road user configured to carry out steps, the steps comprising:
receiving a vehicle-to-X (V2X) message by a V2X communication apparatus belonging to the apparatus, wherein the V2X message comprises time information for determining a system time of a second road user;
determining a system time of the first road user by a computing device of the apparatus;
comparing the system time of the first road user with the system time of the second road user, by the computing device and/or a further computing device of the apparatus, wherein, if a detected discrepancy between the system time of the first road user and the system time of the second road user is equal to a limit value or exceeds the limit value, it is determined whether the system time of the first road user or of the second road user is incorrect; and
correcting the system time of the first road user if it is determined that the system time of the first road user is incorrect, or outputting a control signal for communicating that the system time of the second road user is incorrect by the computing device and/or the further computing device.

* * * * *